US012554920B1

(12) United States Patent
Duran et al.

(10) Patent No.: US 12,554,920 B1
(45) Date of Patent: *Feb. 17, 2026

(54) WEB BROWSING

(71) Applicant: United Services Automobile Association ("USAA"), San Antonio, TX (US)

(72) Inventors: Francisco A. Duran, San Antonio, TX (US); Leena Maria Klint-Looney, San Antonio, TX (US); Kim Earnest Pate, San Antonio, TX (US); Rachel Ann Krebs, San Antonio, TX (US); Jason W. Lindley, Schertz, TX (US); Ann C. Tarrillion, San Antonio, TX (US); Guy R. Langley, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,768

(22) Filed: Oct. 25, 2023

Related U.S. Application Data

(63) Continuation of application No. 17/972,807, filed on Oct. 25, 2022, now Pat. No. 11,836,440, which is a continuation of application No. 16/459,087, filed on Jul. 1, 2019, now Pat. No. 11,507,732, which is a continuation of application No. 14/191,062, filed on Feb. 26, 2014, now Pat. No. 10,387,546.

(60) Provisional application No. 61/832,268, filed on Jun. 7, 2013.

(51) Int. Cl.
*G06F 40/14* (2020.01)
*G06F 16/951* (2019.01)

(52) U.S. Cl.
CPC ............ *G06F 40/14* (2020.01); *G06F 16/951* (2019.01)

(58) Field of Classification Search
None
See application file for complete search history.

(56) References Cited

U.S. PATENT DOCUMENTS

| 8,191,007 | B1 | 5/2012 | Veloz, III |
| 8,839,087 | B1 | 9/2014 | Hayden |
| 9,330,177 | B2 | 5/2016 | Dong |
| 2007/0162864 | A1 | 7/2007 | Masselle et al. |
| 2008/0229231 | A1 | 9/2008 | Delia et al. |

(Continued)

FOREIGN PATENT DOCUMENTS

| WO | 2007033354 A2 | 3/2007 |
| WO | 2014032589 A1 | 3/2014 |

*Primary Examiner* — Amresh Singh
(74) *Attorney, Agent, or Firm* — Plumsea Law Group, LLC

(57) ABSTRACT

A method for grouping of multiple tabs in a web browser includes displaying a plurality of tabs by the web browser. Each tab has separate webpage content associated therewith. Two or more webpages are grouped into at least one category based on semantics of corresponding webpage content. Two or more tabs associated with the two or more grouped webpages are merged into a single tab. The single tab represents the grouped webpages. An aggregated view of contents associated with the grouped webpages is generated and displayed in a single browser window associated with the single tab. The aggregated view has two or more portions. Each portion of the aggregated view concurrently displays content of a corresponding grouped webpage.

20 Claims, 8 Drawing Sheets

(56) References Cited

U.S. PATENT DOCUMENTS

| | | | |
|---|---|---|---|
| 2009/0327947 A1* | 12/2009 | Schreiner | G06F 3/0483 |
| | | | 715/777 |
| 2010/0082670 A1 | 4/2010 | Chan et al. | |
| 2011/0252359 A1 | 10/2011 | England et al. | |
| 2014/0164960 A1 | 6/2014 | Kuo et al. | |
| 2014/0201620 A1* | 7/2014 | Khona | G06F 16/9538 |
| | | | 707/723 |
| 2014/0365853 A1 | 12/2014 | Kleinhout et al. | |
| 2015/0286729 A1* | 10/2015 | Kumar | G06F 16/9535 |
| | | | 707/722 |

* cited by examiner

WEB BROWSING

CROSS REFERENCE TO RELATED APPLICATIONS

This application is a Continuation of U.S. patent application Ser. No. 17/972,807 filed Oct. 25, 2022, which is a Continuation of U.S. patent application Ser. No. 16/459,087 filed Jul. 1, 2019, which is a Continuation of U.S. patent application Ser. No. 14/191,062 filed Feb. 26, 2014 which are incorporated herein by reference in their entirety.

FIELD OF THE INVENTION

The present disclosure relates to Graphical User Interfaces (GUIs) having tabbed browsing features, and more particularly, to improve navigation techniques for tabbed viewing of multiple windows in one or more GUIs providing increased visibility to relevant information.

BACKGROUND OF THE INVENTION

Traditionally, web browsers have included a single window displaying a page of content. When a user enters a universal resource locator ("URL"), clicks on a link on a previously opened page, or otherwise identifies a given page, the browser application retrieves the contents of the selected page and displays it in the browser application window.

Tabbed browsing has been developed to provide users with greater flexibility, including the ability to enable multiple pages to be simultaneously opened within a single browser application window. Each open page is associated with a tab that can be selected by a user, and the contents of the selected tab will be displayed by the browser. If the user desires to retrieve a new page from a website without losing the content contained in an already loaded page, a new tab can be opened and the new content can be loaded and associated with the new tab without disturbing the content of any previously opened tab. The user can then switch back and forth between pages simply by switching between the tabs. Accordingly, in order to work on various webpages concurrently, a user can switch between tabs to call up different webpages, or place (and selectively arrange) multiple browser sessions next to each other and work within respective active windows of the multiple browser sessions. This is both time consuming and confusing.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for grouping of multiple tabs in a web browser is provided. A plurality of tabs is displayed by a web browser. Each tab has separate webpage content associated therewith. Two or more webpages are grouped into at least one category based on semantics of corresponding webpage content. Two or more tabs associated with the two or more grouped webpages are merged into a singletab. The single tab represents the grouped webpages. An aggregated view of contents associated with the grouped webpages is generated and displayed in a single browser window associated with the single tab. The aggregated view has two or more portions. Each portion of the aggregated view concurrently displays content of a corresponding grouped webpage.

In another aspect, a computer program product for grouping of multiple tabs in a web browser is provided. The computer program product comprises one or more computer-readable storage devices and a plurality of program instructions stored on at least one of the one or more computer-readable storage devices. The plurality of program instructions includes program instructions to display a plurality of tabs. Each tab has separate webpage content associated therewith. The plurality of program instructions further includes program instructions to group two or more webpages into at least one category based on semantics of corresponding webpage content. The plurality of program instructions further includes program instructions to merge two or more tabs associated with the two or more grouped webpages into a single tab representing the two or more grouped webpages. The plurality of program instructions further includes program instructions to generate and display an aggregated view of contents associated with the grouped webpages in a single browser window associated with the single tab. The aggregated view has two or more portions. Each portion of the aggregated view concurrently displays content of a corresponding grouped webpage. The content is preferably displayed in a side by side or configurable format controlled by the user.

BRIEF DESCRIPTION OF THE DRAWINGS

The accompanying appendices and/or drawings illustrate various non-limiting, examples, inventive aspects in accordance with the present disclosure.

DETAILED DESCRIPTION OF CERTAIN EMBODIMENTS

Figure 1:
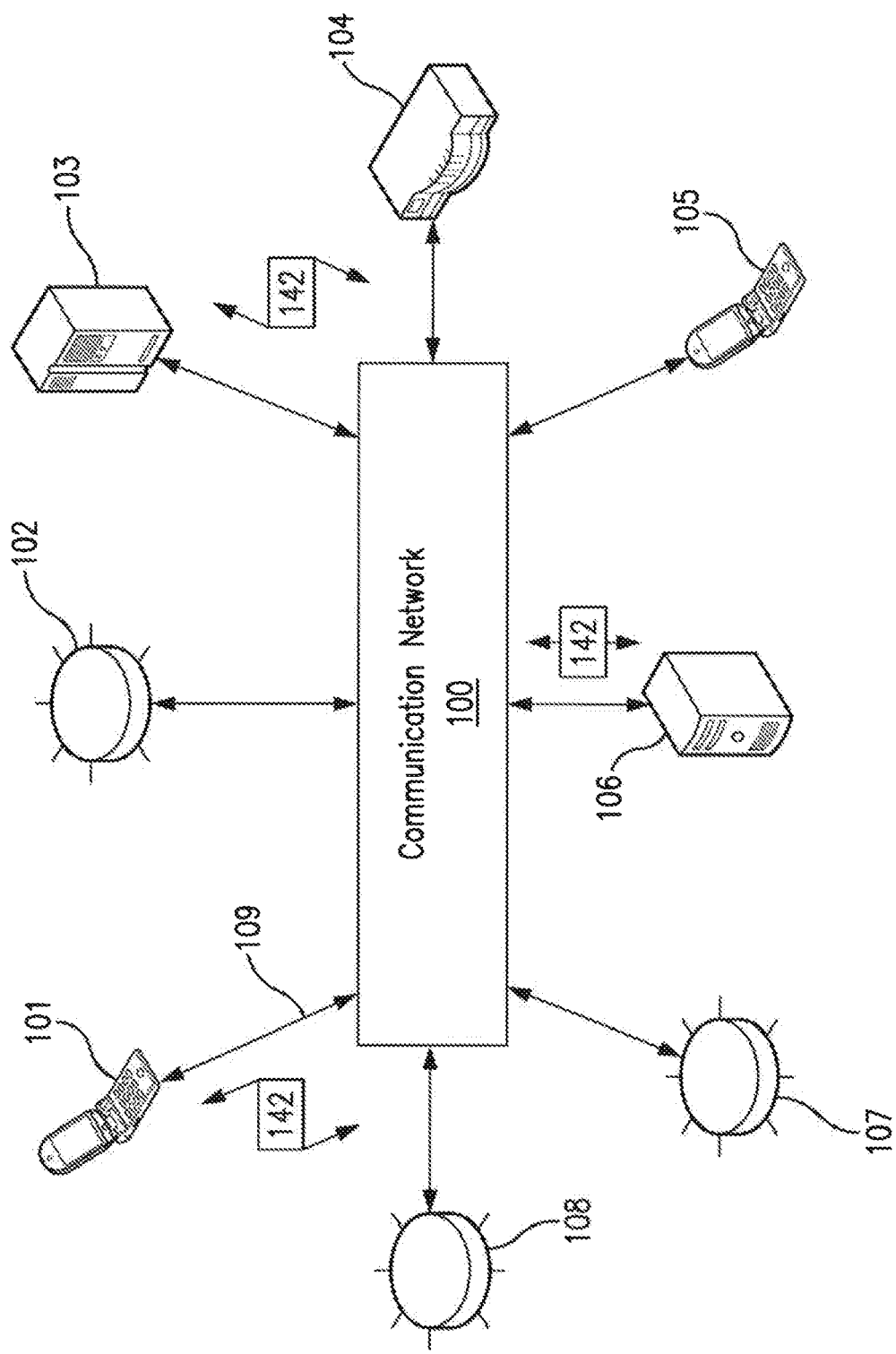
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Often, a user of tabbed browsing system mentally "links" together two, or more, views wherein, because of common content, use, interest, etc. between the views. This commonality of more than one tabbed content may exist for the user, in essence, permanently (i.e. beyond the single working session). There is currently no readily available way for a user to get these semantically related multiple content views automatically merged in a common interface window.

As indicated above, embodiments of the present invention provide a method, system, and computer program product directed to a technique for improved tabbed web browsing. This technique includes automatically grouping contents of more than one active webpage according to user-specified criteria. In these embodiments, the technique further includes merging, via the web browser, each corresponding tab into a single tab and associating the single tab with the common browser window. The technique disclosed herein further includes the browser displaying the single merged tab.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
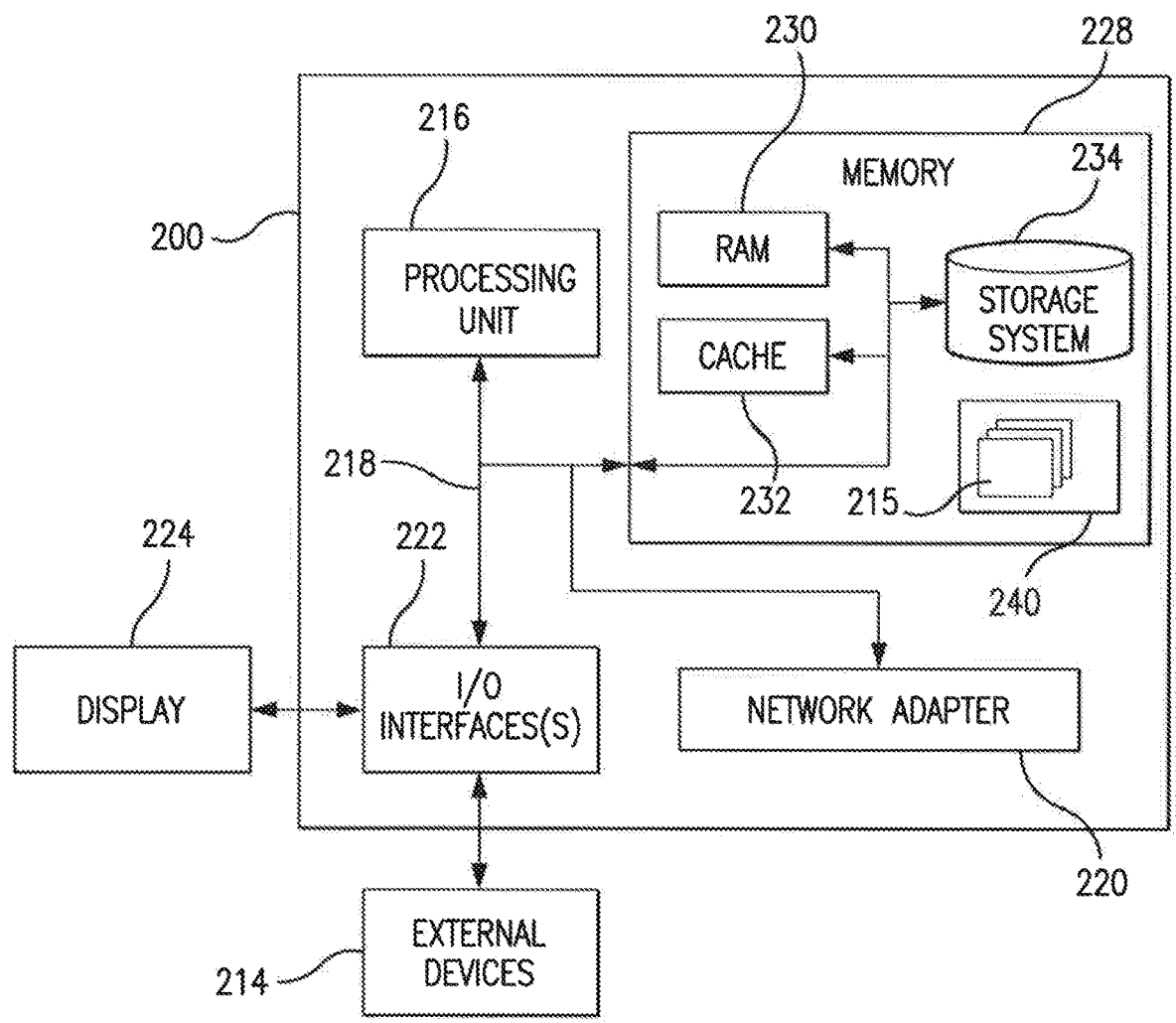
FIG. 2 illustrates a network computer device/node that may be used with one or more embodiments described herein.

FIG. 2 is a schematic block diagram of an example network computing device 200 (e.g., client computing device 103, smart phone device 105, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as tab manager module 406, content analyzer module 408 and search engine module 410 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
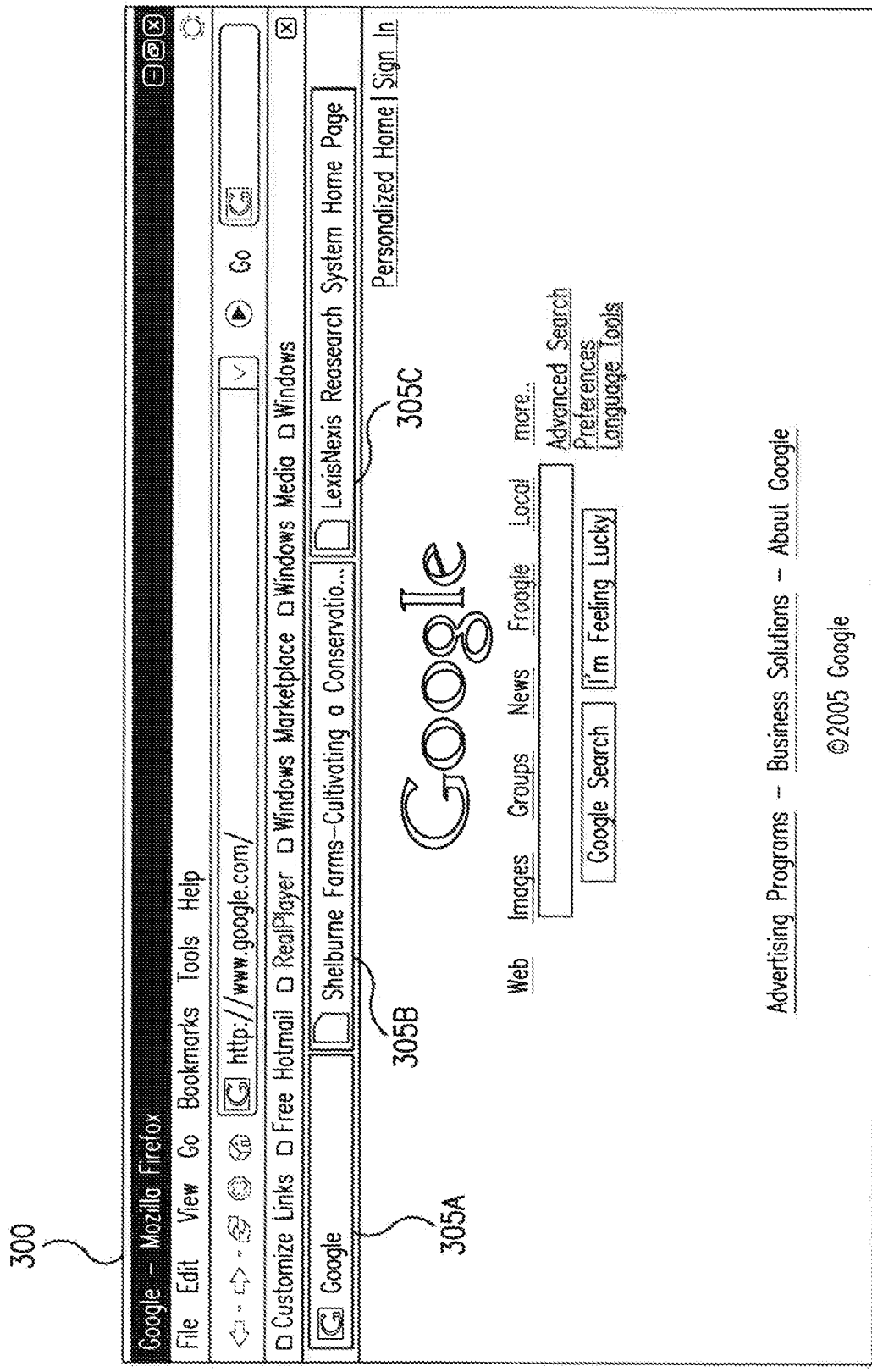
FIG. 3 depicts a conventional computer screen having a tab-based user interface.

With the exemplary communication network 100 (FIG. 1) and computing device 200 (FIG. 2) being generally shown and discussed above, description of certain illustrated embodiments of the present invention will now be provided. With reference now to FIG. 3, an example of a conventional screen display 300 of a tab-based interface described herein is depicted. The screen display 300 includes at least one tab 305 that has a content view 307 associated with it. Typically, there is a plurality of tabs 305 (e.g., 305A, 305B, 305C) so that a user can switch (i.e., "tab") between the various tabs 305 and thereby switch the screen display 300 between the various content views 307 for each particular tab 305.

In the example shown in FIG. 3, there are three tabs 305A (i.e., "Google"), 305B (i.e., "Shelburne Farms"), and 305C (i.e., LexisNexis® Research). Shown in the screen display 300 is the content view 307 for Google (i.e., tab 305A). Thus, if the user opts to see the content view 307 of either "Shelburne Farms" or "LexisNexis", he or she must select the associated tab 305B, 305C, so as to switch the screen display 300 to the particular associated content view 307.

Figure 4:
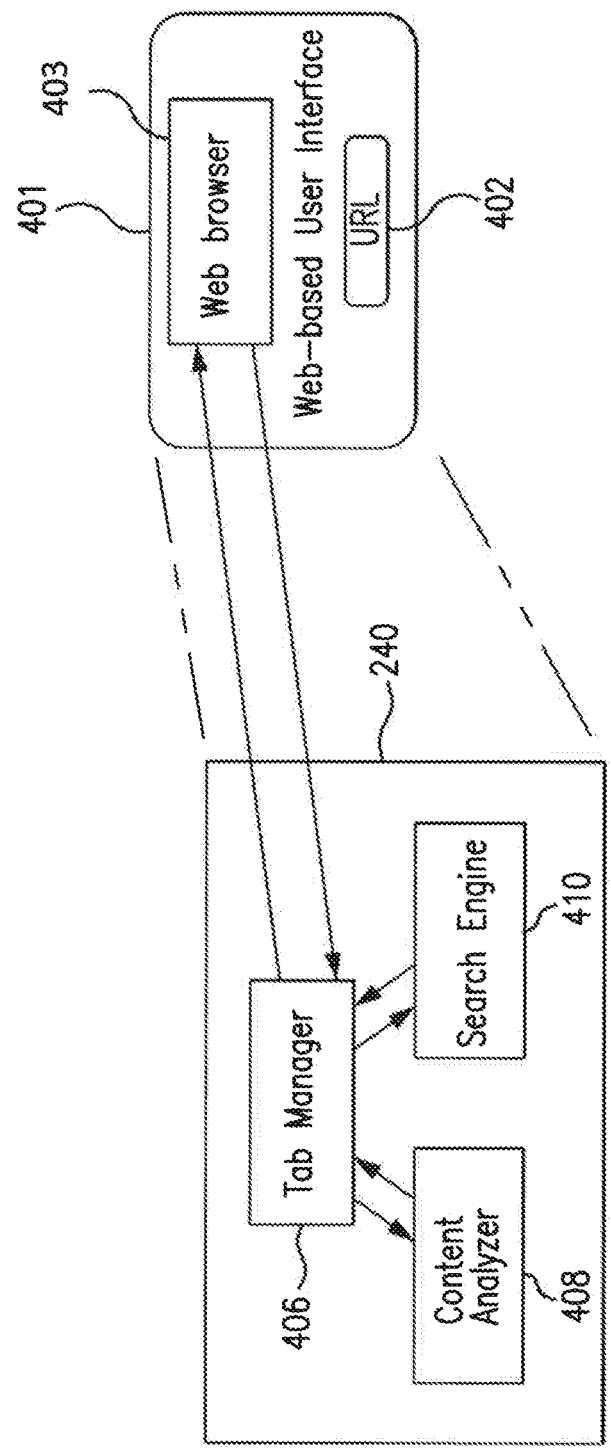
FIG. 4 is a block diagram of a computer system configured to implement various methods described herein according to some embodiments.

In an exemplary embodiment various aspects of the present invention may be incorporated into a tab-based browsing system 240 installed as an application on a device 200 which may be used in connection with a Web-based User Interface (WUI) on the device 200. FIG. 4 shows an example of a number of modules that may be present in such tab-based browsing system 240. The modules will typically be software modules, or otherwise implemented by a programmer in software, and may be executed by the processing unit 216. However, it is also possible for any of the modules of FIG. 4 to be implemented as hardware, a combination of hardware and software, or "firmware", as will be contemplated by those skilled in the art.

According to an embodiment of the present invention, web browser 403 may be incorporated into, or used in connection with a Web-based User Interface 401. WUI is a type of user interface that accepts input and provides output by generating webpages which are transmitted via the Internet and viewed by a user using a web browser program 403. Examples of web browser software include Microsoft Internet Explorer, Apple Safari, Mozilla Firefox, and Google Chrome. To view information in a webpage, the user uses the webpage's URL address to instruct web browser program 403 to access the webpage. Web browser program 403 retrieves the information and visually displays it to the user. Web browser program 403 may be capable of accessing and retrieving data from a remote device such as external server (e.g., web server 106) over a network 100 using the hypertext transfer protocol (HTTP), or some other protocol such as, but not limited to HTTPS or file transfer protocol (FTP).

When web browser program 403 processes the data, the received content may be loaded in the tab that is currently active, or "has focus" and is displayed in the WUI's 401 display area. Next, web browser program 403 may send an association between a tab into which the content was loaded and a corresponding webpage to tab manager 406. Tab manager 406 may keep track of the tabs by maintaining a list of tabs. Each tab may be given a unique identifier, and it may be associated with a position in the display area relative to other tabs. This position may determine how the tabs are displayed. According to an embodiment of the present invention, web browser program 403 may send the contents of the newly loaded webpage along with the tab information to tab manager 406. In response, tab manager 406 may forward the data received from the web browser 403 to content analyzer module 408 capable of analyzing webpage content and to search engine 410 capable of searching the received content. According to an embodiment of the present invention, either content analyzer 408 or search engine 410 may then store a copy of the received content in local memory, such as cache 232 shown in FIG. 2. It is recognized that the content analyzer 408 may be enabled to dynamically develop the semantic context associated with the received webpage content and may be capable to compare information context determined from received information with the semantic context(s) of other pages previously loaded by web browser 403 in order to ascertain which (if any) of the webpage contents are related to each other. As described further below, content analyzer 408 may develop the semantic context based, at least in part, on a user specified criteria. In one embodiment, the search engine module 410 may include a search engine capable of performing a simultaneous search through the merged content displayed by web browser program 403.

Figure 5:
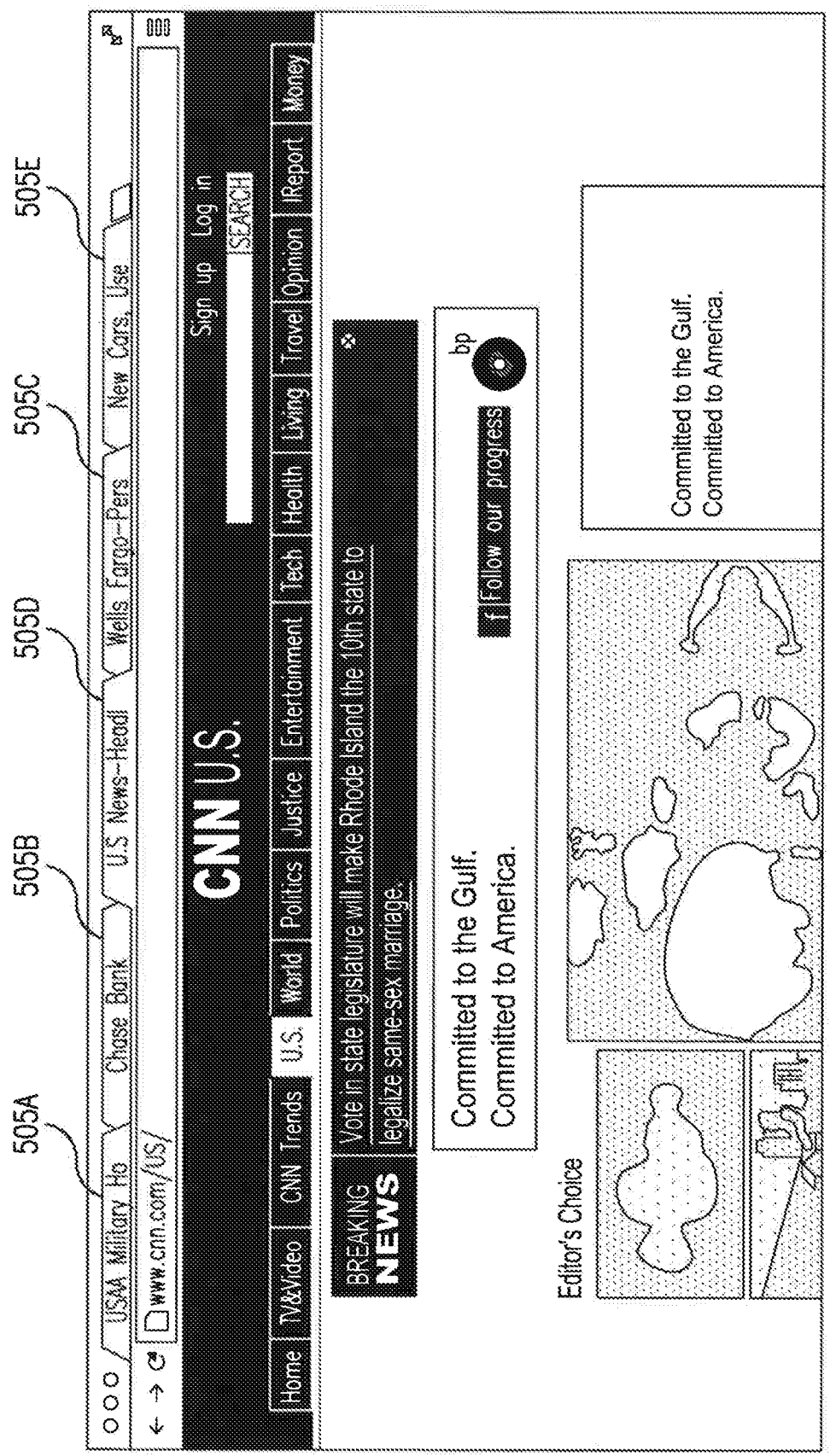
FIG. 5 depicts an illustrative computer screen having a plurality of tabs opened in a single browser session.

FIG. 5 depicts an illustrative computer screen having a plurality of tabs opened in a single browser session. FIG. 5 shows a part of a browser window displayed on a display unit 224 of a computer or device 200. In the illustrative example shown in FIG. 5, there are five tabs 505A-505E. Furthermore, in this example only one tab ("CNN", i.e. tab 505D) is currently active. It is noted that at least some of the five tabs 505A-505E might have common content. Accordingly, it may be desirable for a user to work on various webpages concurrently (i.e., viewing common content concurrently), without switching tabs.

Figure 6:
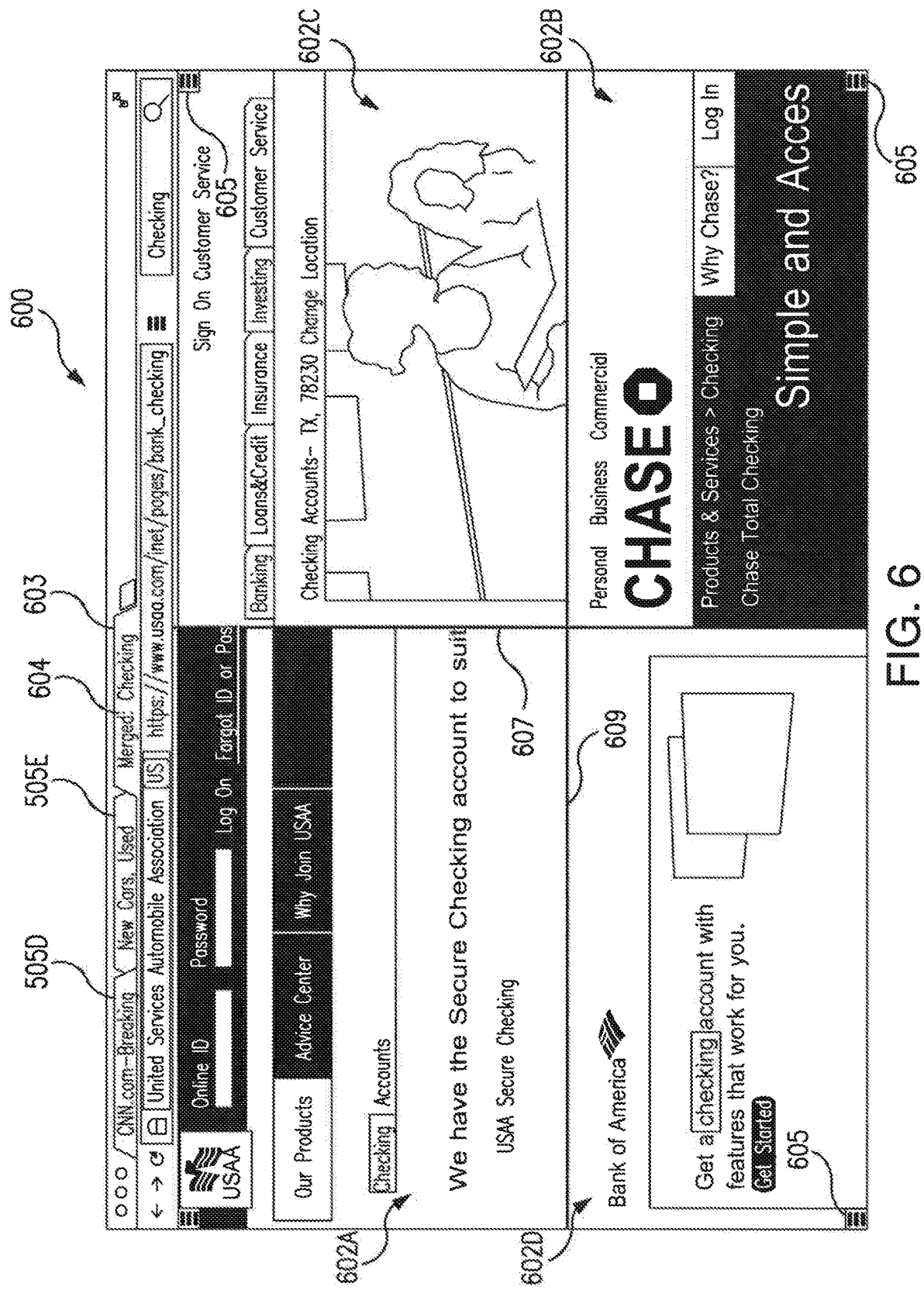
FIG. 6 depicts a view of an illustrative computer screen having a plurality of webpages automatically merged into a single tab based on semantics of corresponding webpage content in accordance with an exemplary embodiment of the present invention.

FIG. 6 depicts a view of an illustrative computer screen having a plurality of webpages automatically merged into a single tab based on semantics of corresponding webpage content in accordance with an exemplary embodiment of the present invention. The related webpages can be merged according to techniques described below. In particular, FIG. 6 provides a screen view 600 wherein four tabs have been merged into a single tab 603 displaying an aggregated view. Each of the four tabs has an associated content segment in the aggregated view. For example, tab 505A has an associated content segment 602A (e.g., USAA webpage), tab 505B has an associated content segment 602B (e.g., Chase Bank webpage), tab 505C has an associated content segment 602C (e.g., Wells Fargo webpage), while the fourth grouped tab (not shown in FIG. 5) has an associated content segment 602D (e.g., Bank of America webpage) of the aggregated view. In this particular example, content segments 602A-602D display contents associated with the webpages grouped into an exemplary category "Checking account" according to a technique described below. As shown in FIG. 6, all four content segments 602A-602D of the aggregated view are being displayed concurrently. It is noted that each content segment 602A-602D displays at least a portion of an active webpage (e.g., if the webpage displays a video, the video would be executing (playing)). In other words, as soon as the single tab 603 containing the aggregated view receives focus (is made active), all of the content segments 602A-602D may also be made active. According to an embodiment of the present invention, the single tab 603 may have a new machine created title 604. For example, as shown in FIG. 6, the merged tab 603 can be displayed as a tab associated with the merged webpage titled: "Merged: Checking" 604.

At least in some embodiments, the content segments (e.g., segments 602A-602D) may be arranged in the aggregated view according to equal proportions. As shown in FIG. 6, the segments 602A-602D may be arranged along the horizontal and vertical direction (diagonal configuration) in non-overlapping fashion separated by delineation line references 607 and 609. It is noted that other configurations, shapes and designs for showing aggregated content view are available with various embodiments of the present invention. However, in some instances, it may be desirable for a user to adjust the default configuration, shape, design, etc. to give certain content more or less focus (i.e., change the default proportion of the aggregated view). For these and similar instances, one or more user interface control associated with each of the content segments 602A-602D of the aggregated view may be generated. In an embodiment of the present invention, one user interface control 605 (referred to hereinafter as a "handle) may be provided for each content segment associated with a corresponding webpage. Each user interface control 605 may be configured to manipulate an attribute such as, but not limited to, a size, location and orientation of the corresponding portion (i.e., content segments 602A-602D) of the aggregated view. Such manipulation can further include adjusting a zoom of a corresponding content segment 602A-602D associated with one of the merged webpages. Such manipulation may further entail unmerging one or more content segments 602A-602D included in the aggregated view by default. In various embodiments, unmerging may include returning a corresponding content segment 602A-602D to a separate tab or entirely closing it via the web browser 403. In one embodiment, a user may be able to adjust the size and/or display proportion of each content segment 602A-602D by manipulation of the delineation line references 607, 609 shown in FIG. 6. Additionally, the handle 605 may enable a user to swap out or replace content segments associated with certain merged webpages with other webpages. In certain embodiments, another user interface control, such as, but not limited to, a panel may be shown to a user via WUI 401 indicating one or more pages recommended for merging, for example, based on past merging history and/or based on previous analysis determining that content of a previously accessed webpage is related to one or more webpages grouped into a particular category.

Other tab selections that have not been automatically grouped (preferably tab manager 406) are shown as tabs 505D and 505E. It is noted, although only a single merged tab 603 and two of ungrouped tabs 505D and 505E are shown, there may exist a plurality of either, or both ungrouped tabs 505D and 505E and merged tabs 603. Alternatively, if contents of all open tabs are determined to be related to each other, there may be no additional tabs available besides the merged tab 603.

Figure 7:
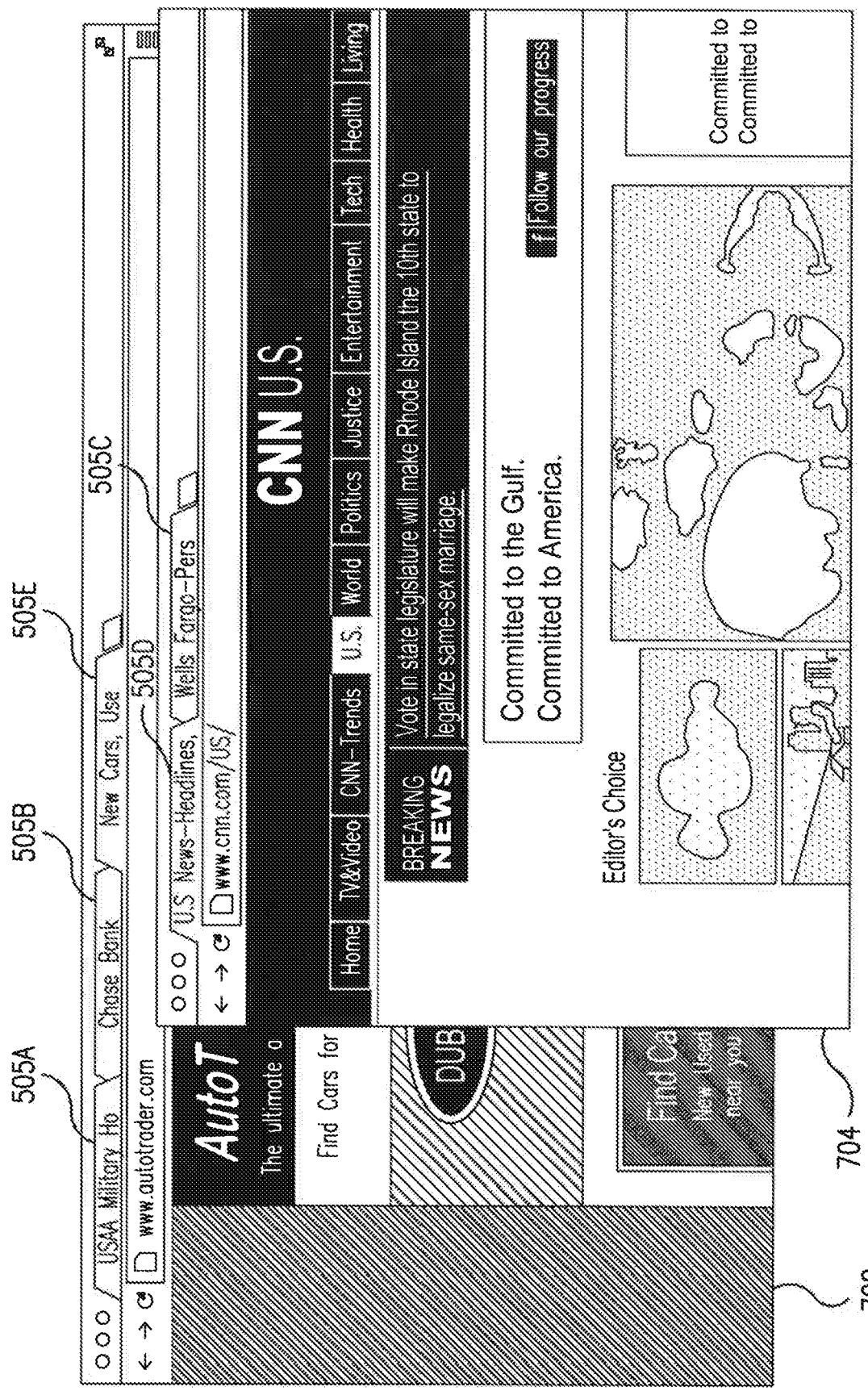
FIG. 7 depicts an exemplary computer screen having a plurality of tabs opened across multiple browser sessions.

FIG. 7 is an exemplary computer screen having a plurality of tabs opened across multiple browser sessions. For example, while an illustrative computer screen depicted in FIG. 6 shows the result of merging of tabs 505A, 505B, 505C according to webpage content in a single browser session (shown in FIG. 5), the illustrative computer screen of FIG. 7 shows that tabs 505 loaded with related content may be grouped across multiple browser sessions. For example, a first browser session 702 may have a first plurality of open tabs (i.e., tabs 505A, 505B and 505E) while a second browser session 704 may have a second plurality of open tabs (i.e., tabs 505C and 505D). As a result of merging the contents of related webpages across multiple browser sessions 702, 704 an aggregated view identical to the aggregated view shown in FIG. 6, may be generated.

Figure 8:
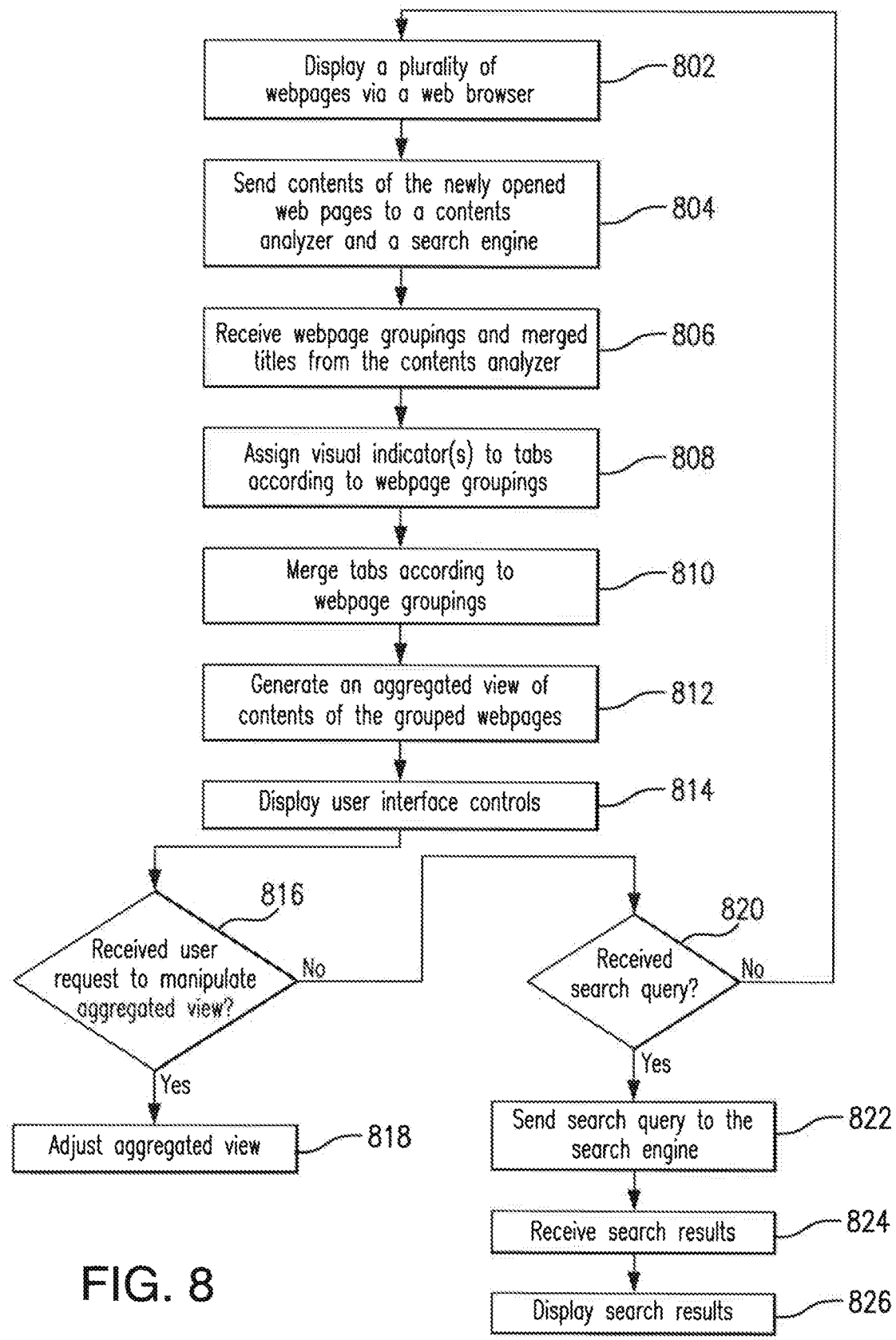
FIG. 8 is a flowchart of operational steps of a tab manager program of FIG. 4 in accordance with illustrative embodiments of the present invention.

FIG. 8 shows, in the form of a flow chart, exemplary operational steps of the tab manager application of FIG. 4 in accordance with illustrative embodiments of the present invention. Before turning to description of FIG. 8, it is noted that the flow diagram shown therein is described, by way of example, with reference to components shown in FIGS. 1-7, although these operational steps may be carried out in any system and are not limited to the scenario shown in the aforementioned figures. Additionally, the flow diagram in FIG. 8 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

As previously indicated, to view information in a webpage, a user typically uses the webpage's URL address to instruct web-browser program 403 to access the webpage. In response, at 802, the web browser program 403 retrieves the information and visually displays it to the user. In addition, at 802, when web browser program 403 processes the data, the received content may be loaded into the newly activated tab. Next, web browser program 403 may send an association between a newly opened tab (e.g., tab 505D in FIG. 5) and the content of a corresponding webpage to tab manager 406. According to an embodiment of the present invention, in response, tab manager 406 may create a list of opened tabs. For example, the list corresponding to an illustrative example shown in FIG. 5 may include tabs 505A-505E. This list may include unique identifiers for the tabs as well as an indication of the tabs present position in relation to other tabs. Also, at 804, tab manager 406 may forward the data received from web browser 403 at step 802 to a content analyzer module 408 capable of analyzing webpage content and to a search engine module 410 capable of searching the received content.

According to an embodiment of the present invention, operatively, the content analyzer 408 is preferably configured to analyze contents of all open tabs in order to group tabs into one or more categories according to, for example, semantics of corresponding webpage contents. In the illustrative examples shown in FIGS. 5 and 6, content analyzer 408 may determine that one or more "banking" webpages represented by tabs 505A-505C may be grouped into the banking category. In various embodiments, content analyzer module 408 may create semantic metadata for received content using natural language processing (NLP), machine learning and other methods. As a non-limiting example, content analyzer module 408 may perform webpage segmentation by segmenting (parsing) the received webpage content into a plurality of coherent and collectively exhaustive nodes (multiple basic content nodes). Also, content analyzer module 408 may compute at least one matrix of affinity values between the separate nodes in separate webpages received at 804 to form at least one affinity matrix and may cluster the nodes into functional areas or blocks based on the at least one matrix of affinity values. The "affinity" is a measure of the probability that the two nodes are interdependent or related to the same subject matter. The affinity values between two different nodes contained within two different webpages can be computed using various techniques well-known in the art.

In an embodiment of the present invention, content analyzer 408 may apply a heuristics rule-based approach when combining the affinity matrices and using them for categorizing different webpages. Many different types of rules with different affinities, using various information, such as but not limited to block positions, tags, font families and Document Object Model (DOM) of the webpage, can be applied. Advantageously, content analyzer 408 may utilize a user-configurable threshold of similarity for grouping two or more analyzed webpages into a particular category. The threshold of similarity specified by the user may describe how well a portion of the webpage content must match a portion of a different webpage to qualify as a related (or same) subject matter. In other words, the threshold of similarity indicates the sensitivity of grouping. For instance, a low sensitivity value assigned to the threshold of similarity may result in content analyzer 408 combining all active webpages (or previously accessed webpages) relating to automobiles due to similar subject matter. On the other hand, a high sensitivity value assigned to similarity threshold may result in content analyzer 408 combining all active webpages (or previously accessed webpages) relating only to a 1967 Ford Mustang automobiles. Similarly, a low sensitivity value assigned to similarity threshold may instruct content analyzer 408 to combine all banking-related webpages into one category, while a high sensitivity value may instruct the content analyzer 408 to combine only checking account related webpages. Examples of specific webpage categories are provided herein for illustrative purposes only and are not intended to be limiting.

It is noted that in addition to grouping similar webpages into one or more categories content analyzer 408 may be configured to generate one or more merged titles corresponding to the one or more categories. For example, merged title 604 shown in FIG. 6 which may be generated by content analyzer 408 may indicate that all webpages included in the aggregated view of FIG. 6 contain information related to user's checking accounts. According to an embodiment of the present invention, at 806, content analyzer 408 may send information related to webpage groupings and merged titles back to tab manager 406.

According to an embodiment of the present invention, after receiving grouping information, at 808, tab manager 406 may optionally assign a visual indicator to one or more categories provided by content analyzer 408 according to a visualization scheme. Such visualization scheme may include, for example, a color-coding scheme or any other indicator to denote similarity. In other words, tab manager 406 may assign a visual indicator in the form of a color, symbol or connection to each of the tabs grouped into the same category. Referring back to the illustrative computer screen depicted in FIG. 5, prior to merging related tabs tab manager 406 may instruct web browser program 403 to change the color of tabs or assign some form of visual indication determined by content analyzer 408 to be inter-related or having a similar content. For instance, a color of tabs 505A, 505B and 505C may change to red prior to their merge or alternatively an icon or symbol may appear to denote the connection between the tabs. It is noted that if content analyzer 408 groups all active webpages into more than one category a plurality of colors or visual indicators may be used. Each color or indicator may be used to represent a particular category. For instance, a user is enabled to rapidly decide to merge tabs together based on reference to their color coding or visual indicator format, e.g., merge all red tabs into a single view.

It may further be advantageous to provide a user with color-coded or visually related tabs in order to obtain user's approval of machine generated classification. It is noted that automated webpage grouping technique described above may not always group webpages as intended by a user. For instance, even though content analyzer 408 may group each of tabs 505A, 505B and 505C into one category, a user may be interested in comparing only information related to Chase and Wells Fargo checking accounts represented by tabs 505B and 505C, respectively. In an embodiment of the present invention, tab manager 406 may provide one or more user interface controls enabling the user to select and/or remove tabs representing irrelevant information prior to generating the aggregated view.

Further, at 810, tab manager 406 may merge tabs according to webpage groupings provided by content analyzer 408 and taking into account user's input with regards to proposed groupings. In other words, this step may involve merging two or more tabs (e.g., tabs 505A-505C shown in FIG. 5) into a single tab (e.g., tab 603 shown in FIG. 6) representing the two or more grouped webpages. It is to be appreciated that tab manager 406 may be configured and operational to automatically merge two or more tabs, or alternatively, may do so upon user instructions.

At 812, tab manager 406 may generate an aggregated view of contents associated with the grouped webpages in a single browser window. For instance, tab manager 406 may load contents of the grouped webpages into the single tab created at 810. Such aggregated view shown in FIG. 6 preferably includes content segments 602A-602D which concurrently display contents associated with the corresponding webpages grouped into a particular category.

Next, at 814, tab manager 406 may generate and display, via web browser 403 at least one user interface control. In one embodiment of the present invention such user interface control may include a plurality of handles 605 configured to manipulate a size, location and orientation of the corresponding portion (i.e., content segments 602A-602D) of the aggregated view. In another embodiment, a single handle 605 may be configured to manipulate various attributes of all content segments 602A-602D included in the aggregated view. In certain embodiments, another user interface control, such as, but not limited to, a panel may be shown to a user via web browser 403 indicating one or more webpages recommended for merging, for example, based on past merging history and/or based on previous analysis determining that content of a previously accessed webpage is related to two or more webpages currently grouped into a particular category.

At 816, tab manager 406 may determine whether a request for manipulating the aggregated view generated at 814 is received from a user. For instance, tab manger 406 may determine whether the user desires to adjust the default configuration, shape, design, etc. to give certain content segments 602A-602D more or less focus (i.e., change the default proportion of the aggregated view). This step may further entail determining whether the user desires to unmerge one or more content segments 602A-602D included in the aggregated view.

In response to determining that the request for manipulating the aggregated view was received from the user (step 816, yes branch), at 818, tab manager 406 preferably adjusts the aggregated view in accordance with the desires of the user. According to an embodiment of the present invention, if tab manager 406 changes the position of one or more content segments 602A-602D and/or unmerges one or more content segments 602A-602D, it may also make corresponding updates with respect to the maintained list of tabs described above. If tab manager 406 determines that there is no request for manipulating the aggregated view (step 816, no branch), at 820, tab manager 406 may check whether the user is interested in searching the aggregated view. One embodiment of the present invention provides a system that facilitates simultaneous searching of merged content via a single search query.

Accordingly, in response to determining that there is at least one content search request from the user (step 820, yes branch) and in response to receiving the corresponding search query from web browser program 403, at 822, tab manager 406 may forward the single search query to search engine module 410. In an embodiment of the present invention search engine module 410 may be configured to search the contents of each content segment 602A-602D (i.e., each merged webpage) simultaneously in response to the single search query. Numerous search engines and search algorithms are known, and any compatible search engine or search algorithm could be used with various embodiments of the present invention.

At 824, tab manager 406 may receive the result of the search from the search engine 410 (shown in FIG. 4). According to an embodiment of the present invention, the search result may comprise one or more "hits" (merged content elements meeting the search criteria). In some embodiments, hits may be rated for relevance based on degree of matching with search criteria and/or other factors, such as user ratings.

According to an embodiment of the present invention, in response to receiving search result from search engine 410, tab manager 406 may forward such result to web browser 403. Web browser 403 is preferably configured to display search result for the contents of each merged webpage in the common browser window, for example, the browser window associated with the single tab 603 shown in FIG. 6. Thus, advantageously, various embodiments of the present invention are directed to a system that facilitates a simultaneous search, via a single search query, of content segments 602A-602D associated with corresponding webpages grouped into a particular category in accordance with the user-specified criteria. It is noted that if the user is not interested in conducting the search (step 820, no branch), tab manager 406 may selectively perform steps 802-818 again, responsive to the user opening a new webpage.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for merging two or more webpages in a web browser, comprising:
    determining a level of similarity of webpage content of each open webpage in the web browser with each other open webpage in the browser such that two or more webpages displayed in the web browser are grouped into a first category, responsive to a user prescribed threshold of similarity that describes a sensitivity of grouping the two or more webpages into the first category, wherein each of the open webpages in the web browser, including the two or more webpages grouped into the first category, are associated with a respective webpage tab;

assigning a visual indicator to the first category that includes the two or more webpage tabs when the determined level of similarity of the two or more webpages meets or exceeds the user prescribed threshold of similarity;

automatically merging the two or more webpages into a single webpage tab representing the merged two or more webpages when the determined level of similarity of the two or more webpages meets or exceeds the user prescribed threshold of similarity, without receiving user instructions to merge the two or more webpages; and generating a single browser window associated with the two or more merged webpages, the single browser window having two or more portions, each of the two or more portions concurrently displaying webpage content of a corresponding merged webpage of the two or more webpages such that the two or more webpage tabs associated with the two or more webpages are merged into the single webpage tab.

2. The method as recited in claim 1, further including providing user tools on a web browser, wherein the user tools are manipulatable by the user for prescribing the level of similarity for webpage content to cause two or more webpages in the web browser to be combined.

3. The method as recited in claim 1, wherein each of the two or more merged webpages comprises an active webpage.

4. The method as recited in claim 1, wherein each of the two or more merged webpages are associated with at least one corresponding title.

5. The method as in claim 4, wherein generating a single browser window includes generating a merged title based on semantics of corresponding webpage contents of the two or more merged web pages and associating the merged title with the single webpage tab.

6. The method as recited in claim 1, wherein generating a single browser window includes displaying at least one user interface control associated with each of the two or more portions of the single browser window.

7. The method as recited in claim 6, wherein each user interface control is configured to be operated by a user to manipulate at least one attribute of the corresponding portion of the single browser window.

8. The method as recited in claim 1, further including merging the two or more webpages into at least two categories, and assigning the visual-indicator to a first category according to a visualization scheme and assigning a second visual-indicator to a second category according to a visualization scheme.

9. The method as recited in claim 8, wherein the visualization scheme is a visual indication scheme and wherein the assigning step comprises assigning a first visual indicator in the form of a visual indication to each of the tabs grouped into the first category.

10. The method as recited in claim 1, wherein the step of merging one or more webpages further includes utilizing a natural language processing technique, a machine learning technique, a model-based technique, a rules-based technique or any combination thereof to classify contents of the one or more webpages.

11. A computer system for merging two or more webpages in a web browser, comprising:

a processor disposed in communication with memory configured to store instructions, wherein the processor upon execution of the instructions is configured to:

determine a level of similarity of webpage content of each open webpage in the web browser with each other open webpage in the browser such that the two or more webpages displayed in the web browser are grouped into a first category, responsive to a user prescribed threshold of similarity that describes a sensitivity of grouping the two or more webpages into the first category, wherein each of the open webpages in the web browser, including the two or more webpages grouped into the first category, are associated with a respective webpage tab;

assign a visual indicator to the first category that includes the two or more webpage tabs when the determined level of similarity of the two or more webpages meets or exceeds the user prescribed threshold of similarity;

automatically merge the two or more webpages into a single webpage tab representing the merged two or more webpages when the determined level of similarity of the two or more webpages meets or exceeds the user prescribed threshold of similarity, without receiving user instructions to merge the two or more webpages; and generate a single browser window associated with the two or more merged webpages, the single browser window having two or more portions, each of the two or more portions concurrently displaying webpage content of a corresponding merged webpage such that two or more webpage tabs associated with the two or more webpages are merged into the single webpage tab.

12. The computer system as recited in claim 11, wherein the processor is further configured to provide user tools on a web browser, wherein the user tools are manipulatable by the user for prescribing a level of similarity for webpage content to cause two or more webpages in the web browser to be combined.

13. The computer system as recited in claim 12, wherein generating a single browser window includes displaying at least one user interface control associated with each of the two or more portions of the single browser window.

14. The computer system as recited in claim 13, wherein each user interface control is configured to be operated by a user to manipulate at least one attribute of the corresponding portion of the single browser window.

15. The computer system as recited in claim 11, wherein each of the two or more merged webpages comprises an active webpage.

16. The computer system as recited in claim 11, wherein each of the two or more merged webpages are associated with at least one corresponding title.

17. The computer system as in claim 16, wherein generating a single browser window includes generating a merged title based on semantics of corresponding webpage contents of the two or more merged web pages and associating the merged title with the single tab.

18. The computer system as recited in claim 11, further including merging the two or more webpages into at least one category, and assigning the visual indicator to the at least one category according to a visualization scheme.

19. The computer system as recited in claim 18, wherein the visualization scheme is a visual indication scheme and wherein the assigning step comprises assigning a visual indicator in the form of a visual indication to each of the tabs grouped into the at least one category.

20. The computer system as recited in claim 11, wherein the step of merging one or more webpages further includes utilizing a natural language processing technique, a machine learning technique, a model-based technique, a rules-based technique or any combination thereof to classify contents of the one or more webpages.

\* \* \* \* \*